May 29, 1962 P. W. HOVEY 3,036,843
SPRING SUSPENSION STEERING KNUCKLES FOR AUTOMOTIVE VEHICLES
Filed Oct. 28, 1960
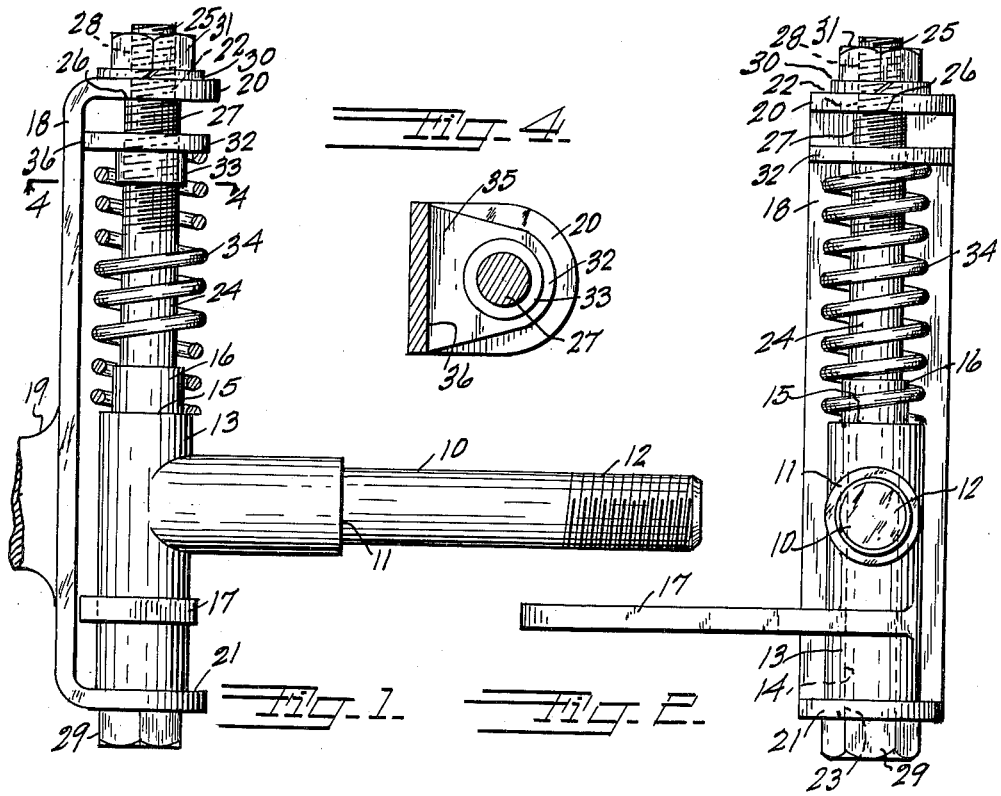
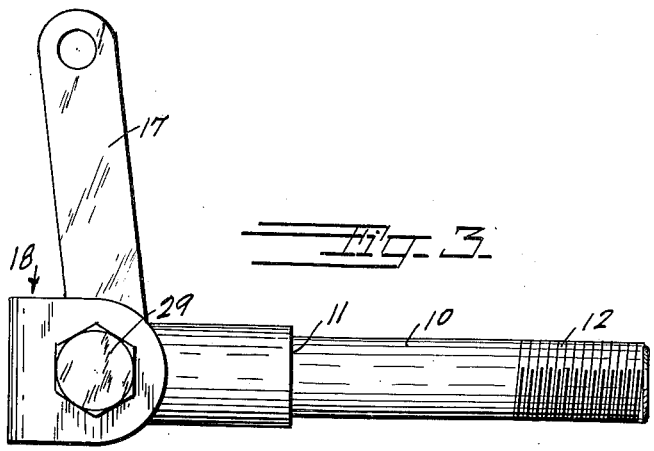
INVENTOR.
Preston W. Hovey
BY Philip A. Truedell
Attorney United States Patent Office 3,036,843
Patented May 29, 1962

3,036,843
SPRING SUSPENSION STEERING KNUCKLES
FOR AUTOMOTIVE VEHICLES
Preston W. Hovey, 701 Heinz Ave., Berkeley, Calif.
Filed Oct. 28, 1960, Ser. No. 65,662
6 Claims. (Cl. 280—96.2)

This invention relates to improvements in steering knuckles with integral spring suspension, and provides a knuckle in which the tension of the spring can be adjusted at will, and being designed originally for installation on karts, a miniature four-wheel power driven vehicle which can only be driven on private property or on race tracks or drag strips, this adjustment is of great importance, since the spring on the right hand wheel for counter-clockwise driving on a course, can be increasingly tensioned for increased stability when rounding the turns, and the same applies for the left hand wheel for clockwise driving, and in view of the adjustability of both springs, the resistance to centrifugal force in rounding turns can be greatly amplified.

The conventional spring suspension on steering knuckles provides no adjustment for tension, the tension being fixed to a predetermined value with both springs being under the same tension, and which is most desirable for standard automotive vehicles used for conventional driving on public thoroughfares, but for all types of racing cars including midgets and karts the individual adjustment of the spring suspensions for the front wheels is of considerable value, greatly reducing the hazards and reducing the probability of accidents to the driver and vehicle.

The objects and advantages of the invention are as follows:

First, to provide a steering knuckle for automotive vehicles which includes an integral spring suspension adjustable as to tension at will.

Second, to provide a device as outlined in which the adjusted tension can be releasably secured against change and which can be changed at will to suit predetermined driving conditions.

Third, to provide a device as outlined which is simple in construction, easily adjusted, and economical to manufacture.

In describing the invention reference will be had to the accompanying drawings in which:

FIG. 1 is a front elevation of the invention.
FIG. 2 is a side elevation of FIG. 1.
FIG. 3 is a bottom plan view of FIG. 1.
FIG. 4 is a section taken on line 4—4 of FIG. 1.

The invention includes a spindle 10 which is provided with the conventional shoulder 11 and threaded end 12 for securing wheel bearings in place, this spindle being integral with a transverse hub 13 which is provided with an axial bore 14 and spring seat 15 with spring pilot 16, and is also provided with an integral steering arm 17.

A shallow-channel shaped yoke or support has a web 18 fixed to or integral with the front axle 19, with the parallel ears 20 and 21 projecting substantially at right angles to the web 18, and being provided with bores 22 and 23 for the respective ends of the kingpin 24.

The main portion of the kingpin 24 is of uniform diameter from the bottom surface of the ear 20 to the bottom surface of the ear 21, and the upper terminal portion of the kingpin is reduced in diameter as indicated at 25 to pass through the bore 22, providing a shoulder at 26 to cooperate with the undersurface of the ear 20, the upper portion of the main portion being threaded as indicated at 27, as is also the reduced diameter portion as indicated at 28, the kingpin having a head 29 by means of which the spring adjustments are made by the use of a conventional wrench, and a lock washer 30 and nut 31 are provided for releasbly locking the adjustment of the spring and securing the kingpin.

A compression spring 34 has one end seated on the seat 15 with adjustable means cooperative with the other end of the spring and including means manually operable for adjusting the adjustable means for adjusting the tension of the spring, and is shown as consisting of a spring seat 32 having a spring pilot 33 for centering the spring, the spring seat and pilot being internally threaded to fit the threaded portion of the main portion of the kingpin, this spring seat having a transverse extension 35 to slidably cooperate with the inside surface of the web 18 as indicated at 36, and is therefore adjustable throughout the extent of that threaded portion 27.

To assemble the device, the hub 13 and spring seat 32 with interposed spring 34 are placed in position between the ears 20 and 21. The kingpin is then passed up through the bore 23 in the lower ear, through the hub 13, spring 34, and threaded into the tension adjusting member 32, with the reduced end passing through the bore 22 in the ear 20, following which the locking means 30 and nut 31 are applied.

To adjust the tension of the spring it is merely necessary to loosen the nut 31 and turn the kingpin by means of the head 29; the views showing the tension increased through adjustment.

I claim:

1. In a steering knuckle having a yoke having a web and a kingpin, and a transverse hub slidable and rotatable on said kingpin, a load spring and a seat on said transverse hub for one end of the spring, adjustable means for adjusting the tension of said spring comprising a spring seat for the other end of said spring and slidably cooperative with said web and retained against rotation thereby and being threadedly adjustable on said kingpin, with the kingpin manually operable for adjusting the tension of said spring at will.

2. In a steering knuckle having a web having an upper and a lower ear having a kingpin rotatably mounted therein, a spindle having a hub at one end slidable and rotatable on said kingpin and having a spring seat at one end, and a compression spring having one end seated on said spring seat; means for adjusting the tension of said spring comprising a second spring seat cooperative with the other end of said spring and threadedly adjustable on said kingpin and slidably cooperative with said web and retained thereby against rotation relative thereto, and means manually operable and associated with said kingpin for adjusting said second spring seat on said kingpin for adjusting the tension of said spring and including releasable securing means for said kingpin for securing said second spring seat through cooperation with said web, in adjusted position.

3. In a steering knuckle, including, a yoke having a web for attachment to the axle of a vehicle and having an upper ear and a lower ear formed in parallelism substantially and at right angles to the web and each having a kingpin passage, a kingpin having a head and extending through the kingpin passages, and releasable securing means for said kingpin, a spindle having a hub slidable on said kingpin and having a first spring seat, and a compression spring having one end seated on said first spring seat, means for adjusting the tension of said spring comprising a second spring seat threadedly adjustable on said kingpin for the other end of said spring said second spring seat having a transverse extension providing keying means slidably cooperative with the web for retaining the second spring seat against rotation for adjusting the tension of said spring at will through rotational operation of the kingpin.

4. A steering knuckle comprising a yoke having a web for attachment of the front axle of a vehicle and having an upper ear and a lower ear formed at right angles to said web and in parallelism and each having a kingpin passage, a kingpin extending through said passages and having a head at one end for manual operation, and releasable securing means for the other end, a spindle having a hub slidable and rotatable on said kingpin and having a first spring seat, and a spring having one end seated on said first spring seat, and an adjustable member having a second spring seat for the other end of said spring and being threadedly mounted on said kingpin for adjustment and including means for retaining said adjustable member against rotation with said kingpin, comprising an extension on said adjustable member slidably cooperative with said web and retained thereby against relative rotation whereby the tension of said spring may be adjusted at will through manual rotational adjustment of said kingpin.

5. In a steering knuckle having a kingpin and a support therefor and a spindle hub slidable and rotatable on said kingpin, and a load spring having one end seated on said hub, means for adjusting the tension of said spring comprising a spring seat threadedly mounted on said kingpin and having an extension slidably and nonrotatably cooperative with said support for maintaining said spring seat against turning with said kingpin, with said kingpin rotatable and securable against rotation at will, whereby release and turning of the kingpin will adjust the tension of the spring.

6. In a steering knuckle having a yoke having a kingpin rotatably adjustable and securable in adjusted position, and a steering hub slidable and rotatable on said kingpin, and a compression spring seated on one end of said hub; means for adjusting the tension of said spring comprising a spring seat threadedly adjustable on said kingpin and having an extension slidably cooperative with said yoke and retained thereby against rotation when said kingpin is rotatably adjusted.

References Cited in the file of this patent
UNITED STATES PATENTS

| | | |
|---|---|---|
| 1,049,620 | Sword | Jan. 7, 1913 |
| 1,376,040 | Roberts | Apr. 26, 1921 |
| 1,454,391 | Loyd | May 8, 1923 |